(12) United States Patent
Cahill et al.

(10) Patent No.: US 11,854,432 B1
(45) Date of Patent: Dec. 26, 2023

(54) DEVELOPING AN E-RATER ADVISORY TO DETECT BABEL-GENERATED ESSAYS

(71) Applicant: Educational Testing Service, Princeton, NJ (US)

(72) Inventors: Aoife Cahill, Lawrence Township, NJ (US); Martin Chodorow, New York, NY (US); Michael Flor, Lawrenceville, NJ (US)

(73) Assignee: Educational Testing Service, Princeton, NJ (US)

( * ) Notice: Subject to any disclaimer, the term of this patent is extended or adjusted under 35 U.S.C. 154(b) by 806 days.

(21) Appl. No.: 16/459,005

(22) Filed: Jul. 1, 2019

Related U.S. Application Data

(60) Provisional application No. 62/692,917, filed on Jul. 2, 2018.

(51) Int. Cl.
| | | |
|---|---|---|
| *G09B 7/02* | (2006.01) | |
| *G06F 16/28* | (2019.01) | |
| *G06F 40/253* | (2020.01) | |
| *G06N 20/20* | (2019.01) | |
| *G06F 40/30* | (2020.01) | |
| *G06N 20/10* | (2019.01) | |
| *G06N 20/00* | (2019.01) | |

(52) U.S. Cl.
CPC .............. *G09B 7/02* (2013.01); *G06F 16/285* (2019.01); *G06F 40/253* (2020.01); *G06F 40/30* (2020.01); *G06N 20/00* (2019.01); *G06N 20/10* (2019.01); *G06N 20/20* (2019.01)

(58) Field of Classification Search
CPC ....... G06F 40/253; G06F 40/30; G06N 20/00; G06N 20/20

USPC .......................................................... 434/353
See application file for complete search history.

(56) References Cited

U.S. PATENT DOCUMENTS

| | | | | |
|---|---|---|---|---|
| 2004/0030723 | A1* | 2/2004 | Gerstl | G06F 16/353 |
| 2010/0036654 | A1* | 2/2010 | Futagi | G06F 40/284 |
| | | | | 704/9 |
| 2015/0052601 | A1* | 2/2015 | White | H04L 63/1416 |
| | | | | 726/13 |

(Continued)

OTHER PUBLICATIONS

Lochbaum, Karen, Rosenstein, Mark, Foltz, Peter, Derr, Marcia; Detection of Gaming in Automated Scoring of Essays with the IEA; Paper presented at the National Council on Measurement in Education Conference (NCME); San Francisco, CA; Apr. 2013. (Year: 2013).*

(Continued)

*Primary Examiner* — Stephen S Hong
*Assistant Examiner* — Broderick C Anderson
(74) *Attorney, Agent, or Firm* — Jones Day

(57) ABSTRACT

Systems and methods are provided for processing a group of essays to develop a classifier that detects nonsensical computer-generated essays. A data structure associated with a group of essays is accessed, wherein the group of essays includes nonsensical computer-generated essays and good-faith essays. Both the nonsensical computer-generated essays and the good-faith essays are assigned feature values. The distribution of feature values between the nonsensical computer-generated essays and the good-faith essays is measured. A classifier that detects whether an essay is a nonsensical computer-generated essay is developed, wherein the classifier is developed using the distribution of feature values.

20 Claims, 11 Drawing Sheets

(56) References Cited

U.S. PATENT DOCUMENTS

2015/0254229 A1* 9/2015 Beigman Klebanov ............... G09B 7/02 434/353
2017/0255840 A1* 9/2017 Jean ............... G06V 10/817
2019/0303796 A1* 10/2019 Balasubramanian .. G06N 7/005

OTHER PUBLICATIONS

Perelman, "Robot Marking : Automated Essay Scoring and Naplan—A Summary Report Semester." (2018). (Year: 2018).*

Attali, Yigal, Burstein, Jill; Automated Essay Scoring With E-rater, v.2; Journal of Technology, Learning, and Assessment, 4(3); pp. 1-30; Feb. 2006.

Beigman Klebanov, Beata, Madnani, Nitin, Burstein, Jill, Somasundaran, Swapna; Content Importance Models for Scoring Writing From Sources; Proceedings of the 52nd Annual Meeting of the Association for Computational Linguistics; Baltimore, MD; pp. 247-252; Jun. 2014.

Bejar, Isaac, Flor, Michael, Futagi, Yoko, Ramineni, Chaintanya; On the Vulnerability of Automated Scoring to Construct-Irrelevant Response Strategies (CIRS): An Illustration; Assessing Writing, 22; pp. 48-59; 2014.

Bennett, Randy; The Changing Nature of Educational Assessment; Ch. 10 in Review of Research in Education, 39(1); pp. 370-407; Mar. 2015.

Breiman, Leo; Random Forests; Machine Learning, 45(1); pp. 5-32; Oct. 2001.

Bridgeman, B., Trapani, C., Attali, Yigal; Comparison of Human and Machine Scoring of Essays: Differences by Gender, Ethnicity, and Country; Applied Measurement in Education, 25; pp. 27-40; 2012.

Flor, Michael, Beigman Klebanov, Beata; Associative Lexical Cohesion as a Factor in Text Complexity; International Journal of Applied Linguistics, 165(2); pp. 223-258; 2014.

Halliday, Michael, Hasan, Ruqaiya; Cohesion in English; Longman: London; 1976.

Halliday, M.; An Introduction to Functional Grammar, 3d Edition; Arnold: London, UK; 2004.

Heilman, Michael, Cahill, Aoife, Madnani, Nitin, Lopez, Melissa, Mulholland, Matthew, Tetreault, Joel; Predicting Grammaticality on an Ordinal Scale; Proceedings of the 52nd Annual Meeting of the Association for Computational Linguistics (Short Papers); Baltimore, MD; pp. 174-180; Jun. 2014.

Higgins, Derrick, Heilman, Michael; Managing What We Can Measure: Quantifying the Susceptibility of Automated Scoring Systems to Gaming Behavior; Educational Measurement: Issues and Practice, 33(4); pp. 36-46; 2014.

Klobucar, Andrew, Deane, Paul, Elliot, Norbert, Ramineni, Chaitanya, Deess, Perry, Rudniy, Alex; Automated Essay Scoring and the Search for Valid Writing Assessment; Ch. 6 in International Advances in Writing Research: Cultures, Places, Measures, C. Bazerman et al. (Eds.); WAC Clearinghouse: Fort Collins, CO; pp. 103-119; 2012.

Levy, Omer, Goldberg, Yoav; Linguistic Regularities in Sparse and Explicit Word Representations; Proceedings of the 18th Conference on Computational Language Learning; Baltimore, MD; pp. 171-180; Jun. 2014.

Lochbaum, Karen, Rosenstein, Mark, Foltz, Peter, Derr, Marcia; Detection of Gaming in Automated Scoring of Essays with the IEA; Paper presented at the National Council on Measurement in Education Conference (NCME); San Francisco, CA; Apr. 2013.

Marathe, Meghana, Hirst, Graeme; Lexical Chains Using Distributional Measures of Concept Distance; Computational Linguistics and Intelligent Text Processing, 6008; pp. 291-302; 2010.

Mikolov, Tomas, Sutskever, Ilya, Chen, Kai, Corrado, Greg, Dean, Jeffrey; Distributed Representations of Words and Phrases and Their Compositionality; Advances in Neural Information Processing Systems; pp. 3111-3119; 2013.

Morris, Jane, Hirst, Graeme; Lexical Cohesion Computed by Thesaural Relations as an Indicator of the Structure of Text; Computational Linguistics, 17(1); pp. 21-48; 1991.

Powers, Donald, Burstein, Jill, Chodorow, Martin, Fowles, Mary, Kukich, Karen; Stumping E-Rater: Challenging the Validity of Automated Essay Scoring; GRE Board Professional Report No. 98-08bP, Educational Testing Service Research Report 01-03; Mar. 2001.

Silber, H. Gregory, McCoy, Kathleen; Efficiently Computed Lexical Chains as an Intermediate Representation for Automatic Text Summarization; Computational Linguistics, 28(4); pp. 487-496; 2002.

Somasundaran, Swapna, Burstein, Jill, Chodorow, Martin; Lexical Chaining for Measuring Discourse Coherence Quality in Test-taker Essays; Proceedings of Coling; Dublin, Ireland; pp. 950-961; Aug. 2014.

Williamson, David, Bejar, Isaac, Hone, Anne; 'Mental Model' Comparison of Automated and Human Scoring; Journal of Educational Measurement, 36(2); pp. 158-184; Summer 1999.

Yoon, Su-Youn, Cahill, Aoife, Loukina, Anastassia; Atypical Inputs in Educational Applications; Proceedings of the North American Chapter of the Association for Computational Linguistics: Human Language Technologies; New Orleans, LA; pp. 60-67; Jun. 2018.

Zhang, Mo, Chen, Jing, Ruan, Chunyi; Evaluating the Advisory Flags and Machine Scoring Difficulty in E-Rater Automated Essay Scoring; Advisory Flags and Scoring Difficulty, Educational Testing Service Research Report Series; pp. 1-14; 2016.

\* cited by examiner

DEVELOPING AN E-RATER ADVISORY TO DETECT BABEL-GENERATED ESSAYS

CROSS-REFERENCE TO RELATED APPLICATIONS

This application claims priority to U.S. Provisional Application No. 62/692,917, filed Jul. 2, 2018, the entirety of which is herein incorporated by reference.

TECHNICAL FIELD

The technology described herein relates to automated essay scoring and classification, and more particularly building a classifier that can be integrated into an automated scoring engine.

BACKGROUND

It is important for developers of automated scoring systems to ensure that their systems are as fair and valid as possible. This means evaluating the performance of these systems in light of construct-irrelevant response strategies (e.g., strategies designed to receive high scores from automated scoring engines despite not providing a substantive response to a prompt). This is often an iterative process, whereby as new strategies come to light they need to be evaluated and effective mechanisms built into the automated scoring systems to handle them. For example, certain systems are capable of generating semantically incohesive essays. It is expected that these essays may unfairly receive high scores from automated scoring engines despite essentially being nonsensical. Accordingly, there is a need to perfectly distinguish the nonsensical essays from the good-faith ones. Further, there is a need to distinguish these nonsensical essays within automated scoring engines.

SUMMARY

Systems and methods are provided for processing a group of essays to develop a classifier that detects nonsensical computer-generated essays. A data structure associated with a group of essays is accessed, where the group of essays includes nonsensical computer-generated essays and good-faith essays. Both the nonsensical computer-generated essays and the good-faith essays are assigned feature values. The distribution of feature values between the nonsensical computer-generated essays and the good-faith essays is measured. A classifier that detects whether an essay is a nonsensical computer-generated essay is developed, where the classifier is developed using the distribution of feature values.

As another example, a system for processing a group of essays to develop a classifier that detects nonsensical computer-generated essays includes one or data processors and a computer-readable medium encoded with instructions for commanding the one or more processors to execute steps. In the steps, a data structure associated with a group of essays is accessed, where the group of essays includes nonsensical computer-generated essays and good-faith essays. Both the nonsensical computer-generated essays and the good-faith essays are assigned feature values. The distribution of feature values between the nonsensical computer-generated essays and the good-faith essays is measured. A classifier that detects whether an essay is a nonsensical computer-generated essay is developed, where the classifier is developed using the distribution of feature values.

As a further example, a computer-readable medium is encoded with instructions for commanding one or more data processors to execute a method for processing a group of essays to develop a classifier that detects nonsensical computer-generated essays. In the method, a data structure associated with a group of essays is accessed, where the group of essays includes nonsensical computer-generated essays and good-faith essays. Both the nonsensical computer-generated essays and the good-faith essays are assigned feature values. The distribution of feature values between the nonsensical computer-generated essays and the good-faith essays is measured. A classifier that detects whether an essay is a nonsensical computer-generated essay is developed, where the classifier is developed using the distribution of feature values.

DETAILED DESCRIPTION

Figure 1:
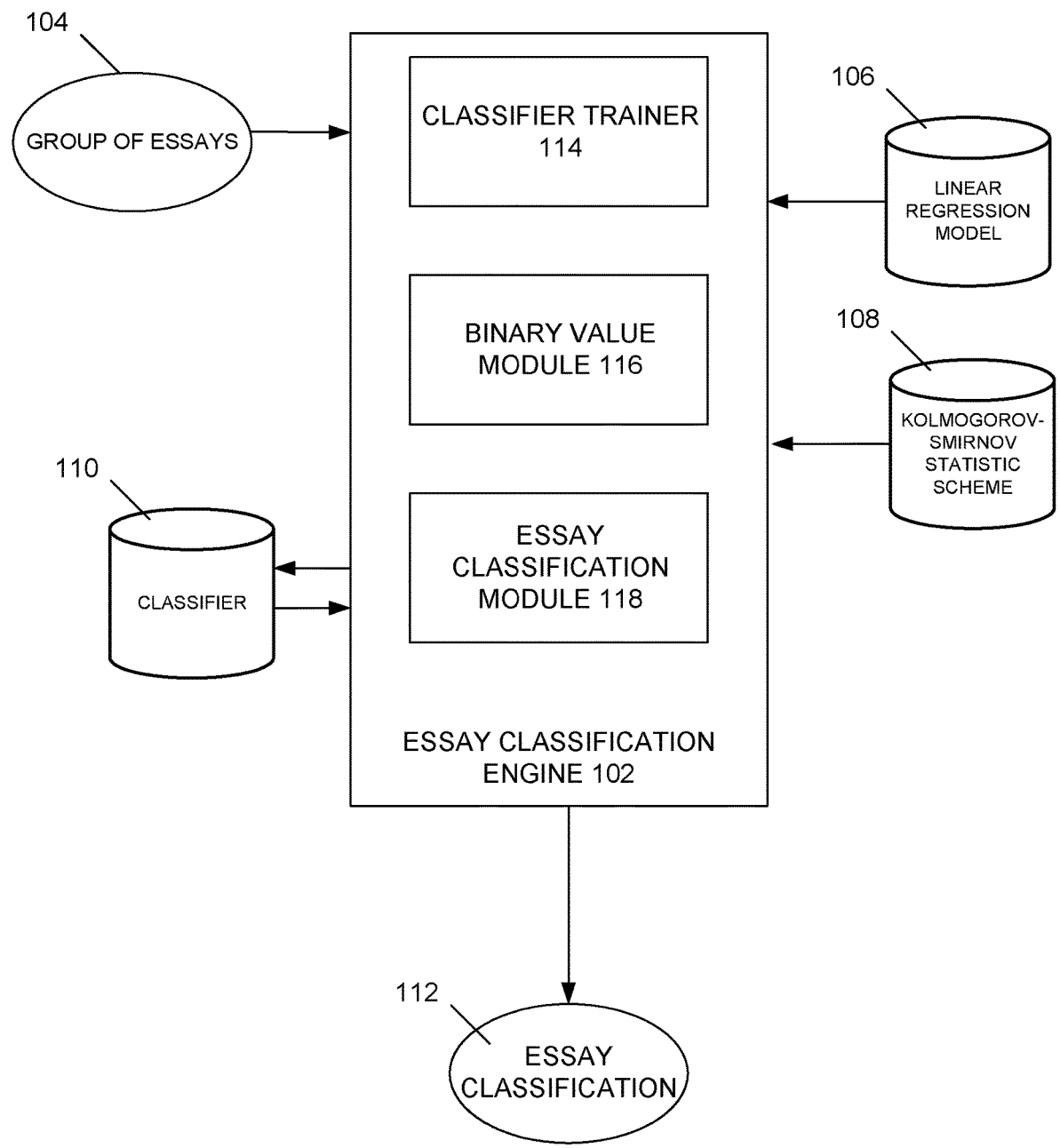
FIG. 1 is a diagram depicting a computer-implemented system for processing a group of essays to generate an essay classification that is transmitted across a computer network or displayed on a graphical user interface.

The demand for automated scoring of student responses has increased in recent years as technology continues to advance and yield more sophisticated automated scoring capabilities. This is reflected in an increase in computer-based administration of large-scale assessments (e.g. at the state level) where automated scoring is often seen as a time and cost-saving solution. Research has shown that use of automated scoring can lead to more objective overall scoring and can maintain test reliability, but there are often concerns at the individual level about what an automated scoring system is measuring and whether it is appropriate to substitute a computer score for a human score.

For example, discussions in Australia have criticized the proposed introduction of automated scoring for the National Assessment Program—Literacy and Numeracy (NAPLAN), an annual assessment for all students in Years 3, 5, 7 and 9 in Australia. Automated scoring had been proposed for the persuasive and narrative writing items and was planned to be fully implemented by 2020. Ultimately, automated scoring for those tests was postponed indefinitely. All of this controversy calls attention to the shifting nature of educational assessment.

As another example, a frequently-raised concern about automated scoring systems is the fact that they do not "read" student responses in the same way that humans do, instead using features that are approximations of factors that humans take into account when applying the scoring rubrics. This can sometimes lead to the automated scoring systems being susceptible to techniques that try to fool the system into giving a higher score than is warranted. For example, simply writing a long essay is one perceived method of getting a higher score. This is because there is a natural link between the ability to write well in a timed setting, and the length of the response—which is something automated scoring models often pick up on. Of course, just writing a long response should not automatically lead to a high score from the automated scoring system, particularly if that long response is incoherent and full of errors.

As automated scoring systems develop, developers try to build in filters or flags for responses that look aberrant in order to maximize the validity of the systems. However, they almost certainly cannot think of everything and, to some extent, rely on the writing community to identify potential weaknesses in the system, which can then be addressed to further improve the validity of the system and thus the scores produced for test takers.

The Babel essay generation system is a tool for automatically generating essays that are intended to fool automated scoring engines. The input to the tool is a list of keywords, which the tool uses to randomly generate an essay designed to fool automated scoring systems. The essay appears to be well-formed in terms of syntactic structures, and it uses complex English words. However, the essays are completely incoherent. The following is a snippet from an essay generated by submitting the keywords "snow" and "holidays."

Vacation has not, and in all likelihood never will be trite in the way we accuse exiles. Vacation is the most fundamental device of society; some of stealth and others on adherents. The preternatural snow lies in the realm of literature along with the field of philosophy. Why is holiday so boisterous to gluttony? The reply to this query is that snowfall is pugnaciously Libertarian.

In one example, the outcomes of sending Babel essays to an automated scoring engine (such as Educational Testing Service's e-rater) was examined. It was hypothesized that e-rater would assign high scores to these essays because, while semantically flawed, they appear to be syntactically accurate, well-formed from a discourse perspective, and include an excessive number of longer, and low-frequency words.

In another example, it was examined whether it is possible to automatically distinguish Babel essays from essays written in good faith, and if so, whether it is possible to integrate this capability back into the e-rater engine to prevent overscoring of nonsense essays of this kind. In another example, a measure of semantic cohesion was developed, and its distribution in Babel and in good-faith essays was examined.

In an example, the e-rater engine was used as an automated scoring system. e-rater is a system developed by Educational Testing Service to automatically score essays. It uses Natural Language Processing (NLP) techniques to automatically extract linguistically-motivated features of writing that are then used in a linear regression model to predict a final score for an essay. e-rater also contains what are known as "advisories" which flag responses with certain characteristics such as being off-topic, too repetitious, etc. These advisories are generally meant as indicators that the e-rater score is unreliable. In high-stakes assessments, responses that are flagged with advisories are typically routed to a human for additional review.

In a sample study, two versions of e-rater were used. The first, a version from 2014, was used to determine the e-rater score distribution for the Babel essays and to guide the sampling of a good-faith dataset. The second, a newer one from 2016, was used for the remainder of the analyses and experiments. This newer engine contained several updates (bug fixes, library updates, etc.) over the previous engine, as well as some new features: discourse coherence, which relies on measures of transition cues and lexical chains; grammaticality, based on a language model and n-gram counts; and source use.

Examples of the scoring features used in e-rater were given in Table 1, along with brief descriptions of the writing construct that they were designed to measure. The features that were only available in the 2016 engine were marked with an asterisk.

TABLE 1 e-rater features used for scoring. Features marked with * are only available in the 2016 version.

| Feature | Feature Explanation |
| --- | --- |
| NSQG | Grammar errors |
| NSQU | Usage errors |
| NSQM | Mechanics errors |
| LOGDTA | Development |
| LOGDTU | Organization |
| NWF_MEDIAN | Vocabulary sophistication |
| COLPREP | Correct usage of collocations and prepositions |
| SVF | Sentence Variety |
| WORDLN_2 | Lexical Complexity |
| GRAMMATICALLITY* | Holistic measure of grammaticality |
| DIS_COH* | Discourse Coherence |
| SOURCE_USE2* | How well source material is integrated into the response |

An example study focused on high-stakes assessments, and targeted data collection from three high stakes assessments (5 tasks total): two tasks from an assessment of analytical writing as part of a graduate school test (datasets A and B); one task from a test of writing used to evaluate candidates for entry into teacher preparation programs (dataset C); and two tasks from an assessment of English proficiency (datasets D and E). In the example, 100 prompts (20 per task) were selected to base the data collection on.

In an example, answering the research questions required two sources of data: (1) Essays generated by the Babel system; and (2) Essays written by students in good faith. With respect to essays generated by the Babel system, for each prompt, the top key terms were manually determined and used as the keywords for the Babel generator. For each of the 100 prompts selected in the example, at least 1,000 essays were generated using the Babel tool. The process was automated and the queries were performed using Amazon Web Services. With respect to the essays written by students in good faith, good-faith student responses (i.e. responses that receive a human score of >0) were selected to the same set of prompts as in dataset (1). These responses, which were written in a high-stakes assessment context, were chosen such that the e-rater score and prompt distributions were similar for datasets (1) and (2). This was done to ensure that the essays in both datasets were comparable in terms of how e-rater views them. Each essay in both datasets was processed with e-rater according to the appropriate scoring model (there was a separate scoring model for each task).

In an example, the distribution of e-rater feature values between the Babel-generated essays and the good-faith essays was compared. The Kolmogorov-Smirnov (K-S) statistic was used to measure how different two distributions of feature values are. This is a two-sided test for the null hypothesis that two independent samples are drawn from the same continuous distribution. If the value of the K-S statistic is small with a large p-value, then the hypothesis that the distributions of the two samples are the same cannot be rejected. Conversely, a high K-S value with a small p-value indicates that the hypothesis can be rejected with some certainty.

In an example, a classifier was built to detect whether an essay was a Babel-generated one or not. The classifier was trained on e-rater feature values extracted for both the Babel-generated essays and the corresponding good-faith essays. The data from all tasks in the example was combined. The data was randomly split into training and test partitions, using 80% and 20% of the data respectively. A random-forest classifier was built on the training data and its performance was evaluated on the test data. The random-forest classifier is an ensemble classifier based on decision trees where the final prediction is the mode of the classes of the individual trees.

In the example, a new e-rater advisory was developed using the classifier, such that the advisory is triggered whenever the classifier detects a Babel essay, given a set of features for an essay. A large number of student essays were processed from each of the 5 tasks corresponding to the initial 5 datasets. The total numbers of essays processed per task were: A (70,874), B (71,023), C (142,888), D (139,122) and E (10,749).

In an example, semantic cohesion is estimated in the following way. Semantic relatedness between two words is computed as the cosine value between their numeric vector representations. Such values are computed for all pairs of content words in an essay, and then their average is taken. This value represents the average semantic cohesion for the text. A content word is identified as any word that is not a digits-only string (e.g. '1984') and is not on a list of 54 stop-words (which includes determiners, common prepositions, and some other very common words). The content words' word2vec vectors are used with 300 dimensions, pre-trained on 100 billion words of Google News.

Figure 10:
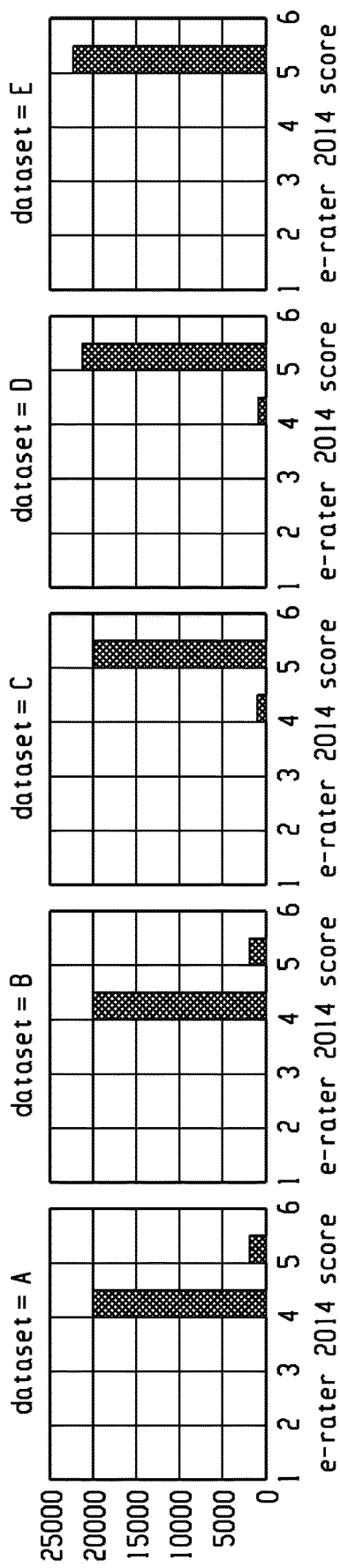
FIG. 10 gives the distribution of scores assigned to the essays by the e-rater engine.

In total, 106,239 Babel essays are collected for 100 prompts. A summary of the number of essays and prompts per task is given in Table 2. FIG. 10 gives the distribution of scores assigned to the essays by the e-rater engine. In the example, most of these essays receive a score of 4 or 5, much higher than they would be assigned by a human rater. In practice, for high-stakes assessments such as the GRE or TOEFL, these kinds of essays where e-rater predicts a far higher (or lower) score than a human rater are routed to expert human raters for additional scoring, and the e-rater score is typically discarded. e-rater does not generate an advisory for any of these essays.

TABLE 2

The number of Babel-generated essays collected for each task.

| | A | B | C | D | E |
|---|---|---|---|---|---|
| Total essays | 21,917 | 21,979 | 21,359 | 21,987 | 21,969 |
| Total prompts | 20 | 20 | 20 | 20 | 20 |

As an example, Table 3 gives the K-S statistics comparing the e-rater features between Babel and good-faith essays for each task. The p-values (not shown in the table) are all statistically significant at p<0.001. The K-S statistics for the GRAMMATICALITY and NWF MEDIAN features are consistently high, at or near a value of 1.00 which indicates non-overlapping distributions. This reinforces the intuition that the Babel essays are unusual from both a vocabulary and a lexical co-occurrence view, since the NWF MEDIAN feature measures vocabulary sophistication and the GRAMMATICALITY feature gives a holistic measure of grammaticality based on a language model and n-gram counts, which are sensitive to lexical frequency.

TABLE 3

Kolmogorov-Smirnov statistics for the difference between Babel and good-faith essays for e-rater features for each task

| | A | B | C | D | E |
|---|---|---|---|---|---|
| COLPREP | 0.98 | 0.98 | 0.99 | 0.97 | 0.93 |
| DIS_CON | 0.59 | 0.22 | 0.57 | 0.41 | 0.88 |
| GRAMMATICALITY | 0.99 | 1.00 | 1.00 | 1.00 | 0.07 |
| LOGDTA | 0.26 | 0.26 | 0.36 | 0.38 | 0.77 |
| LOGDTU | 0.42 | 0.44 | 0.39 | 0.43 | 0.77 |
| NSQG | 0.89 | 0.92 | 0.93 | 0.89 | 0.75 |
| NSQM | 0.25 | 0.21 | 0.27 | 0.24 | 0.37 |
| NSQU | 0.71 | 0.71 | 0.75 | 0.66 | 0.56 |
| NWF_MEDIAN | 1.00 | 1.00 | 1.00 | 1.00 | 1.00 |
| SOURCE_USE2 | | | | | 0.75 |
| SVF | 0.41 | 0.427 | 0.36 | 0.17 | 0.40 |
| WORDLN_2 | 0.97 | 0.97 | 0.98 | 0.99 | 0.98 |

As an example, results of the random-forest classifier are given in Table 4 and show that the classifier is able to distinguish with 100% accuracy the BABEL essays from the good faith essays in the test data.

TABLE 4

Classification results of Babel essay detection (total essays). Row = reference; Column = prediction.

| | BABEL | Good Faith |
|---|---|---|
| BABEL | 21851 | 0 |
| Good Faith | 0 | 19409 |

As an example, Table 5 shows how many times the new e-rater advisory was triggered for the five datasets, as well as the distribution of original human scores for the flagged essays. A score of null or 0 means that the essay was marked as non-scorable by the human.

TABLE 5

Number of essays triggering Babel advisory
for each task by score point and dataset

| Human Score | A | B | C | D | E |
|---|---|---|---|---|---|
| Null or 0 | 1 | 1 | 0 | 8 | 48 |
| 1 | 0 | 0 | 0 | 4 | 27 |
| 2 | 0 | 0 | 0 | 0 | 1 |
| 3 | 0 | 0 | 0 | 0 | 0 |
| 4 | 0 | 0 | 0 | 0 | 0 |
| 5 | 0 | 0 | 0 | 0 | 0 |
| 6 | 0 | 0 | 0 | 0 | 0 |
| Total | 1 | 1 | 0 | 12 | 76 |

In the example, it is shown that the new advisory is triggered most for the essays in dataset E (from the test of English proficiency), and mostly for essays that received a human score of Null, 0 or 1. A human score of 0 or null indicates that the responses were non-scorable (e.g. off topic, plagiarized, etc.). For example, there was one essay for which the Babel advisory was triggered in the example that the human score was greater than 1. The example essay that was flagged by this advisory follows:

the yeatcher made three primary guides that react toward recmmendations made in the perusing sectiom. while the perusing entry propses three conceivable methode for managing the new guania flatworms vicinity in Europe, yhe teadher clarified why each of the yherr ways do not fill in as takes after Firt and foremot, the teatcher clarified that Biolgical Control does not work following the new Guinia flatworm does not have any characteristic predators, in spit of the presumption made in the content the educator clarified that even differet, se The example essay uses some relatively rare words as well as some long words (e.g. perusing, conceivable, characteristic, predators, presumption), albeit not entirely correctly, and has many misspelled words. In general, this advisory is not triggered very often in high-stakes situations, which is not all that surprising since students are unlikely to naturally (or even from memory) generate the kinds of text that the Babel system does.

For example, Table 6 gives the average semantic cohesion values for Babel essays and good-faith essays for each of the 5 datasets, as well as the t-test results for tests of significant differences between them. The average lexical cohesion of Babel-generated essays is much lower than in human-written essays, for all five datasets (testing programs). The differences are highly statistically significant. Table 7 gives the K-S statistics for the five datasets for these average cohesion values.

TABLE 6

Results of t-tests and Descriptive Statistics for Semantic
Cohesion, for five datasets

| | Source | | | | | | |
|---|---|---|---|---|---|---|---|
| | BABEL | | | Good-Faith | | | |
| dataset | M | SD | n | M | SD | n | t |
| A | 0.096 | 0.003 | 21979 | 0.126 | 0.014 | 21979 | −298.88 * |
| B | 0.092 | 0.003 | 21979 | 0.114 | 0.011 | 21917 | −273.69 * |
| C | 0.095 | 0.003 | 21359 | 0.135 | 0.016 | 13354 | −362.06 * |
| D | 0.093 | 0.003 | 21987 | 0.132 | 0.016 | 19886 | −343.58 * |
| E | 0.093 | 0.003 | 21969 | 0.103 | 0.011 | 19928 | −132.79 * |

* $p < .0001$.

TABLE 7

Kolmogorov-Smirov statistics for the difference in average semantic
cohesion between Babel and good-faith essays for each task.

| | A | B | C | D | E |
|---|---|---|---|---|---|
| Average Semantic Cohesion | 0.90 | 0.94 | 0.98 | 0.98 | 0.60 |

In an example, the classifier that is built is able to perfectly identify Babel essays compared to essays with similar scores given by e-rater in the test set. The classifier takes advantage of the fact that the Babel essays are trying to "game" e-rater in a particular way, i.e. by using rare long words in syntactically reasonable constructions. The analysis shows that the distributions of certain feature values in Babel and good-faith essays are essentially disjoint, particularly for features related to vocabulary sophistication and grammaticality. Consequently, the classifier built using these features was able to learn to separate the two classes (Babel and Good-Faith).

In an example, a new advisory for e-rater that is developed is designed to flag automatically generated, nonsensical, Babel essays. On new data, almost all of the essays that are flagged by this advisory had received a human score of null, 0 or 1, indicating general poor quality of writing. In a high-stakes operational setting, this advisory would result in the essay being routed to a second human, rather than letting e-rater assign a score. Given that e-rater has a tendency to over-score these types of essays, this is a prudent approach.

In an example, the t-test results show that there are statistically significant differences in the means in values of the semantic cohesion measure between the Babel-generated essays and the good-faith essays, but the K-S statistic shows that for dataset E, there is still considerable overlap in the distributions. For datasets A-D, the results show that the most semantically cohesive Babel-generated essays are only as cohesive as the least-cohesive essays written by examinees in good faith.

An example for applying this measure to distinguishing Babel-generated essays from good-faith essays is to apply some threshold for cohesion values. For datasets A-D, this would allow to easily distinguish incohesive essays and most of the Babel-generated essays (although the threshold value might be different for different testing programs).

One example includes understanding the implication for the sets of good-faith essays whose cohesion scores overlap with Babel essay cohesion scores. Another example is to include the semantic cohesion feature in the classifier used to detect Babel-generated essays.

In an embodiment, it is shown that it is possible to automatically distinguish Babel-generated essays from good-faith high-scoring essays by building a classifier trained on both kinds of essays and using e-rater features.

The Babel-generated essays receive scores from e-rater that are too high to be credible, but by integrating a classifier that detects Babel-generated essays into the system, such essays are automatically flagged to be sent for additional human review if required (or report a 0 score if it is not possible to have a human in the loop, e.g. in an online practice test setting).

In another embodiment, it is shown that a more general, semantically-inspired, method of quantifying the cohesion of essays is promising in terms of being able to distinguish Babel-generated essays from good-faith ones. The results from these experiments will lead to an improved version of e-rater which should no longer award such nonsense essays real scores. Continued research into the semantic cohesion feature will also potentially lead to an improved version of e-rater in the future.

The examples discussed above follow a common pattern: a gaming strategy is identified and subsequently developers of automated scoring systems try to ensure that they are not fooled. Of course, it will be important to continue to be diligent about newly-discovered methods of gaming automated scoring and continue to develop methods to detect and/or counteract them. In parallel, it is incumbent to continue to develop more sophisticated automated scoring features that capture aspects of the writing construct that current features do not, or only poorly, address (e.g. semantic cohesion). For example, this can be done by developing a research program that identifies weaknesses in construct representation and then supports projects to investigate and develop capabilities to expand the construct representation of the automated scoring system.

The Babel essay generator is an extreme example of how nonsense essays can fool automated scoring engines, since a student is unlikely to be able to generate such text in a test setting. In some ways, that makes Babel essays somewhat easier to identify than essays that, say, contain only some nonsense sentences intermixed with reasonable text. The bigger challenge is to better identify the underlying linguistic reasons for the nonsense interpretation at the sentence level and use that to improve automated scoring and feedback. One obvious direction for this kind of research is to look at verb-argument semantics and identify semantic selectional restriction violations. This could lead to a more general method of detecting nonsense at the sentence level which could be used to detect Babel essays as well as more subtle kinds of nonsense that are potentially more plausible in a high-stakes assessment setting.

The examples disclosed above show that it is possible to detect the kind of gaming strategy illustrated by the Babel system and add it to an automated scoring engine without adverse effects on essays seen during real high-stakes tests. In the examples disclosed above, a classifier is able to perfectly identify Babel essays compared to essays with similar scores given by e-rater. The examples also show that a measure of semantic cohesion can separate Babel-generated essays from good-faith essays to a certain degree, depending on task. Future work would generalize this capability to detect semantic incoherence in essays.

FIG. 1 is a diagram depicting a computer-implemented system for processing a group of essays to generate an essay classification that is transmitted across a computer network or displayed on a graphical user interface. In the example of FIG. 1, the essay classification 102 engine includes a classifier trainer 114, a binary value module 116, and an essay classification module 118. The essay classification engine 102 receives a data structure 104 associated with a group of essays. In an example, the essay classification engine may access one or more linear regression modules 106 that assign feature values using extracted linguistically-motivated features of writing. The essay classification engine may also access a Kolmogorov-Smirnov statistic scheme 108 to determine the distribution of feature values between the group of essays. For example, the linear regression modules 106 and Kolmogorov-Smirnov statistic scheme 108 can be used by the classifier trainer 114 to develop a classifier 110 that detects whether an essay is a nonsensical computer-generated essay. In another example, the essay classification engine 102 may use the classifier 110 to set a binary value at the binary value module 116, and use the binary value in the essay classification module 118 to generate an essay classification 112. The essay classification 112 can then, for example, be output for display on a graphical user interface, transmitted across a computer network, or printed.

Figure 2:
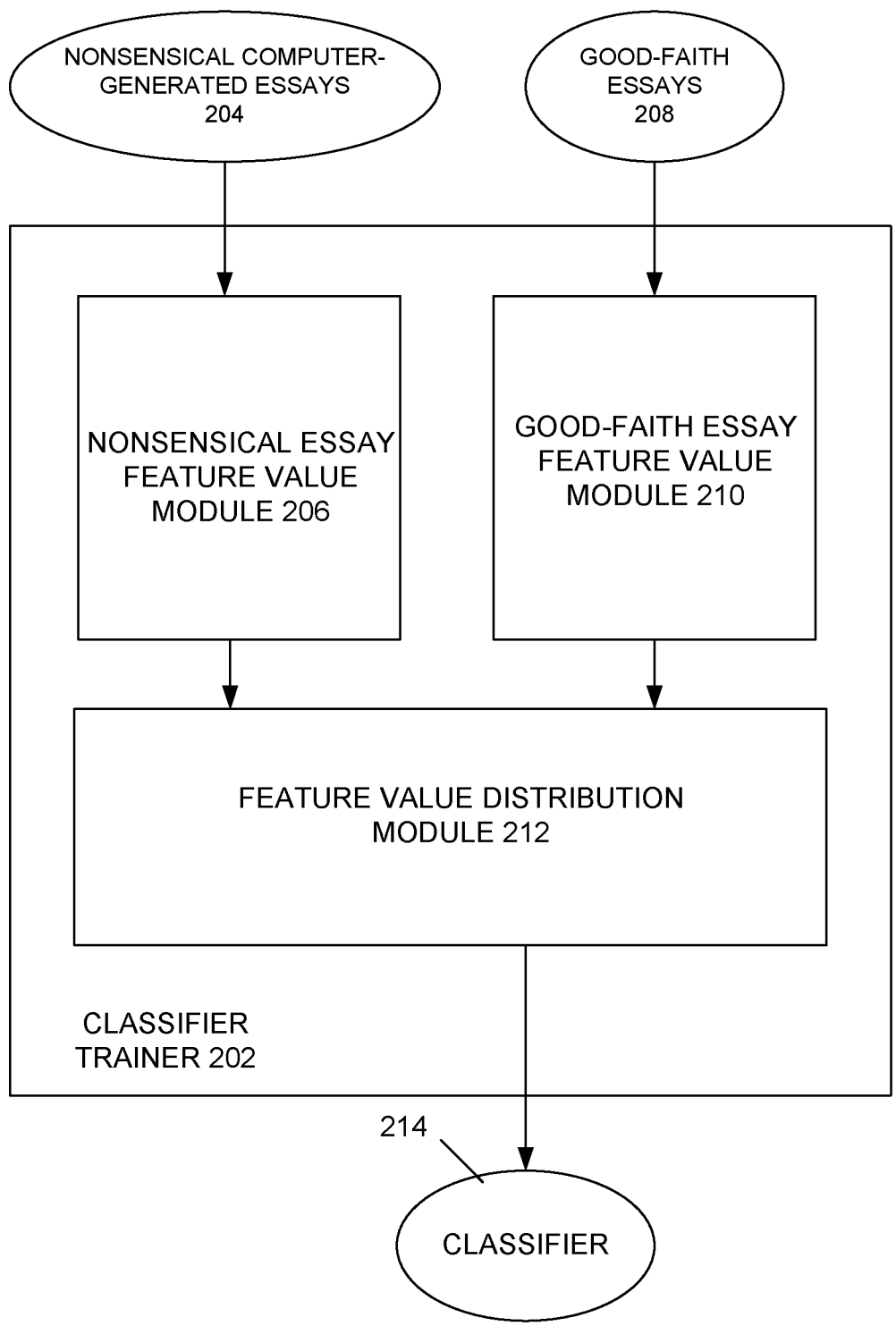
FIG. 2 is a diagram depicting a computer-implemented system for processing a group of essays to develop a classifier that detects nonsensical computer-generated essays.

FIG. 2 is a diagram depicting a computer-implemented system for processing a group of essays to develop a classifier that detects nonsensical computer-generated essays. The classifier trainer 202 receives a data structure 204 associated with nonsensical computer-generated essays and a data structure 208 associated with good-faith essays. The classifier trainer 202 includes a nonsensical essay feature value module 206 that assigns feature values for nonsensical computer-generated essays and a good-faith essay feature value module 210 that assigns feature values for good-faith essays. In the example of FIG. 2, the feature value distribution module 212 then receives both feature values to measure the distribution of feature values between the nonsensical computer-generated essays and the good-faith essays. A classifier 214 is then developed using the distribution of feature values.

Figures 3A, 3B:
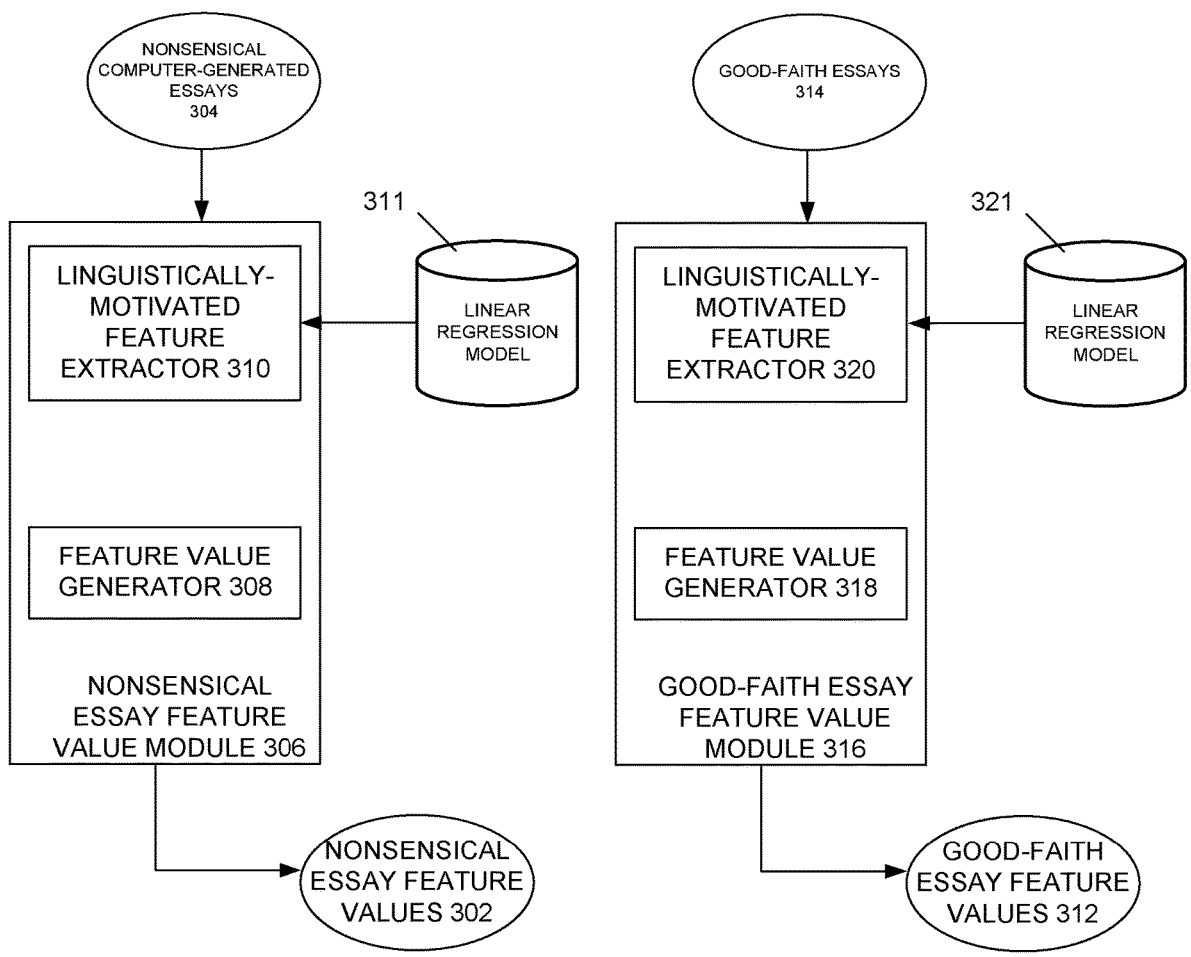
FIG. 3A is a diagram depicting a computer-implemented nonsensical essay feature value module for assigning feature values for nonsensical computer-generated essays.
FIG. 3B is a diagram depicting a computer-implemented good-faith essay feature value module for assigning feature values for good-faith essays.

FIG. 3A is a diagram depicting a computer-implemented nonsensical essay feature value module for assigning feature values for nonsensical computer-generated essays. In the example, the nonsensical essay feature value module 306 receives nonsensical computer-generated essays 304. A linguistically-motivated feature extractor 310 then extracts the linguistically-motivated features of writing for the nonsensical computer-generated essays. In an example, the linguistically-motivated features of writing are then used in a linear regression model 311. The feature value generator 308 assigns feature values 302 for the nonsensical computer-generated essays. The nonsensical essay feature value module 306 then outputs the nonsensical essay feature values 302.

FIG. 3B is a diagram depicting a computer-implemented good-faith essay feature value module for assigning feature values for good-faith essays. In the example, the good-faith essay feature value module 316 receives good-faith essays 314. A linguistically-motivated feature extractor 320 then extracts the linguistically-motivated features of writing for the good-faith essays. In an example, the linguistically-motivated features of writing are then used in a linear regression model 321. The feature value generator 318 assigns feature values 312 for the good-faith essays. The good-faith essay feature value module 316 then outputs the good-faith essay feature values 312.

Figure 4:
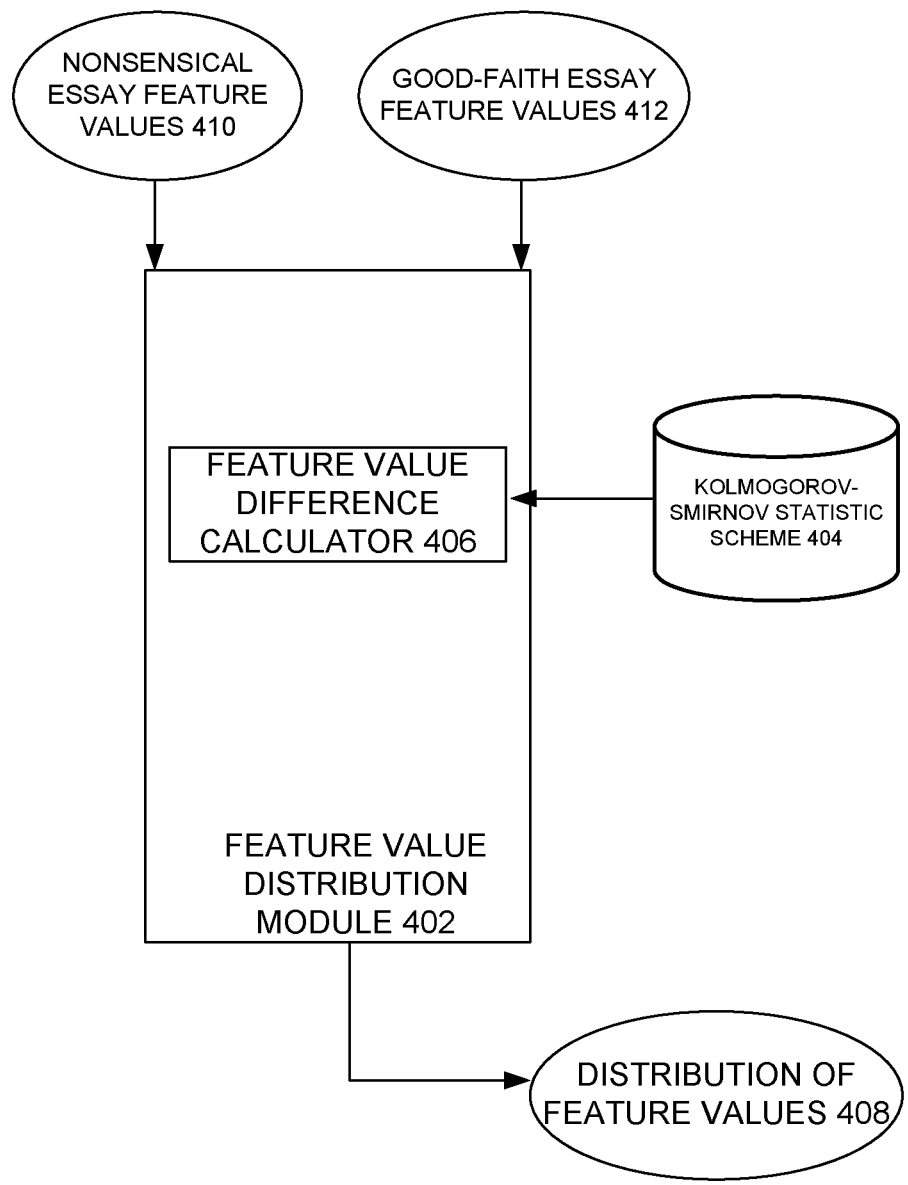
FIG. 4 is a diagram depicting a computer-implemented feature value distribution module for measuring the distribution of feature values between the nonsensical computer-generated essays and good-faith essays.

FIG. 4 is a diagram depicting a computer-implemented feature value distribution module for measuring the distribution of feature values between the nonsensical computer-generated essays and good-faith essays. In the example, the feature value distribution module 402 receives nonsensical essay feature values 410 and good-faith essay feature values 412. The feature values are then sent to the feature value difference calculator 406 for calculation of the distribution of feature values between the nonsensical computer-generated essays and good-faith essays. In an example, the distribution is measured using the Kolmogorov-Smirnov statistic scheme 404, which applies the Kolmogorov-Smirnov statistic. The feature value distribution module 402 then outputs the distribution of feature values 408.

Figure 5:
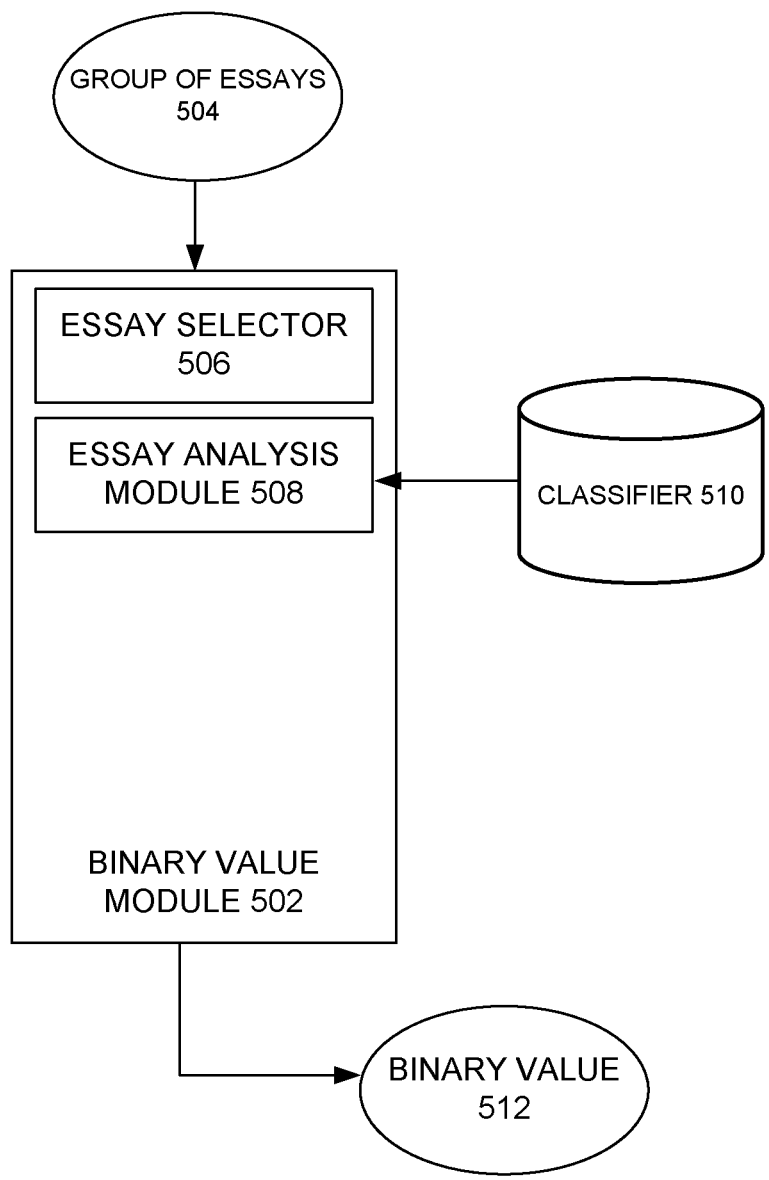
FIG. 5 is a diagram depicting a computer-implemented binary value module for analyzing an essay from the group of essays to set a binary value.

FIG. 5 is a diagram depicting a computer-implemented binary value module for analyzing an essay from the group of essays to set a binary value. In the example, the binary value module 502 receives a group of essays 504. An essay selector 506 selects an essay from the group of essays 504 to send to the essay analysis module 508. In an example, the essay analysis module 508 applies a classifier 510 to the group of essays to determine whether an essay is a nonsensical computer-generated essay or a good-faith essay. If the classifier 510 determines that the essay is nonsensical computer-generated essay, it sets a binary value for that essay. The binary value module 502 then outputs the binary value 512.

Figure 6:
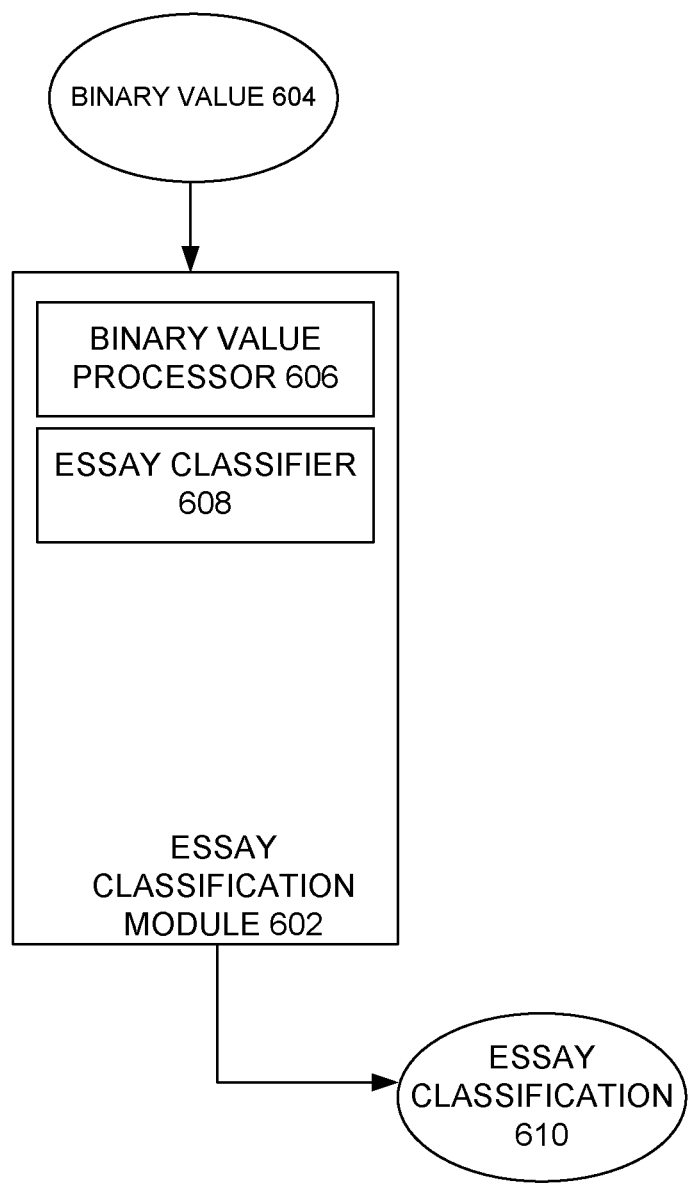
FIG. 6 is a diagram depicting a computer-implemented essay classification module for generating an essay classification based on the binary value

FIG. 6 is a diagram depicting a computer-implemented essay classification module for generating an essay classification based on the binary value. In the example, the essay classification module 602 receives a binary value 604. The binary value processor 606 determines whether the binary value is set. If the binary value is set, the essay classifier 608 classifies the essay as a nonsensical computer-generated essay. If the binary value is not set, the essay classifier 608 classifies the essay as a good-faith essay. The essay classification module then outputs the essay classification 610.

Figure 7:
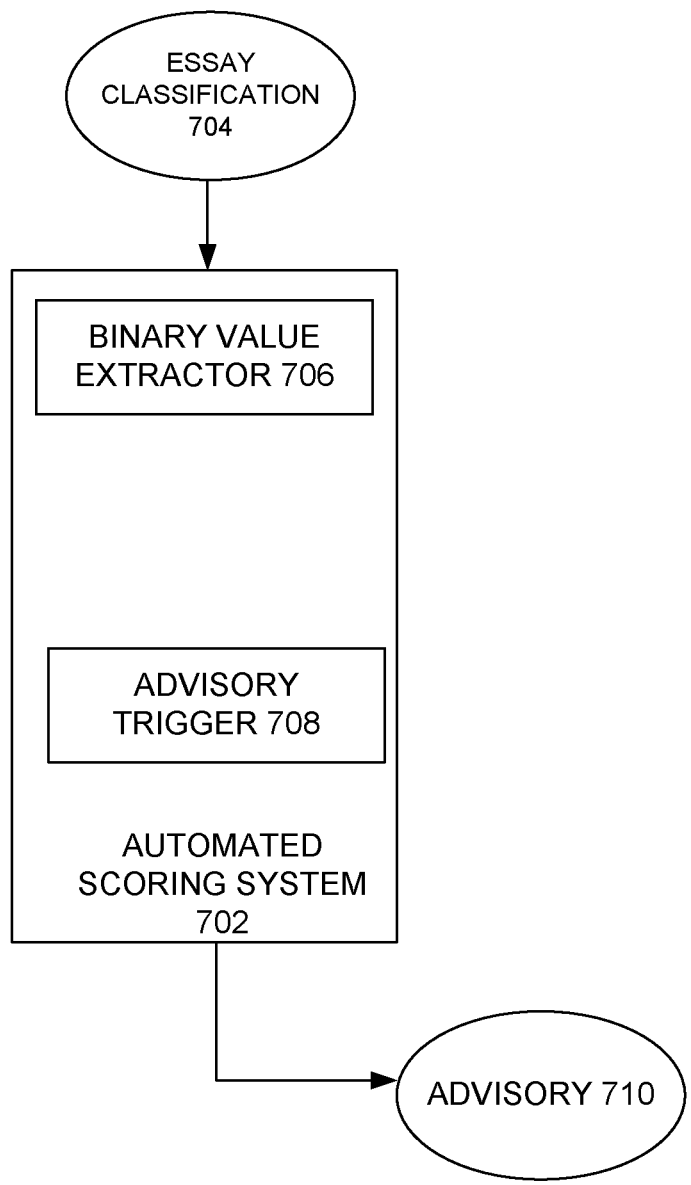
FIG. 7 is a diagram depicting a computer-implemented system for applying the essay classification to an automated essay scoring system.

FIG. 7 is a diagram depicting a computer-implemented system for applying the essay classification to an automated essay scoring system. In the example, the automated scoring system 702 receives an essay classification 704. The binary value extractor 706 extracts the corresponding binary value for the essay classification 704 and sends it to the advisory trigger 708. If the binary value is set, the advisory trigger 708 is activated and the automated scoring system 702 outputs an advisory 710.

Figure 8:
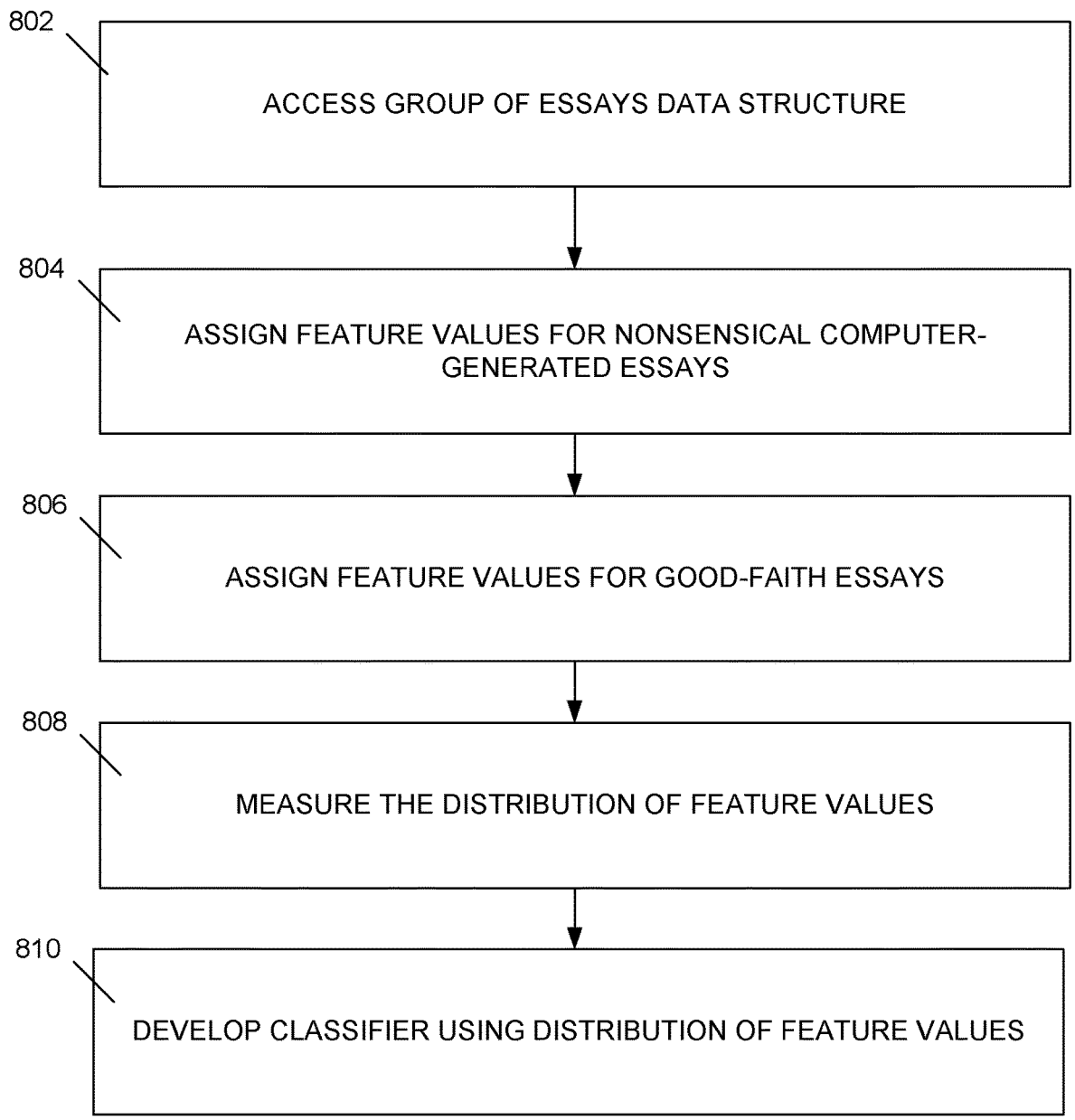
FIG. 8 is a flow diagram depicting a processor-implemented method for processing a group of essays to detect nonsensical computer-generated essays.

FIG. 8 is a flow diagram depicting a processor-implemented method for processing a group of essays to detect nonsensical computer-generated essays. A data structure associated with a group of essays is accessed at 802, where the group of essays includes nonsensical computer-generated essays and good-faith essays. The nonsensical computer-generated essays are assigned feature values at 804. The good-faith essays are assigned feature values at 806. The distribution of feature values between the nonsensical computer-generated essays and the good-faith essays is measured at 808. A classifier that detects whether an essay is a nonsensical computer-generated essay is developed at 810, where the classifier is developed using the distribution of feature values.

Figure 9A:
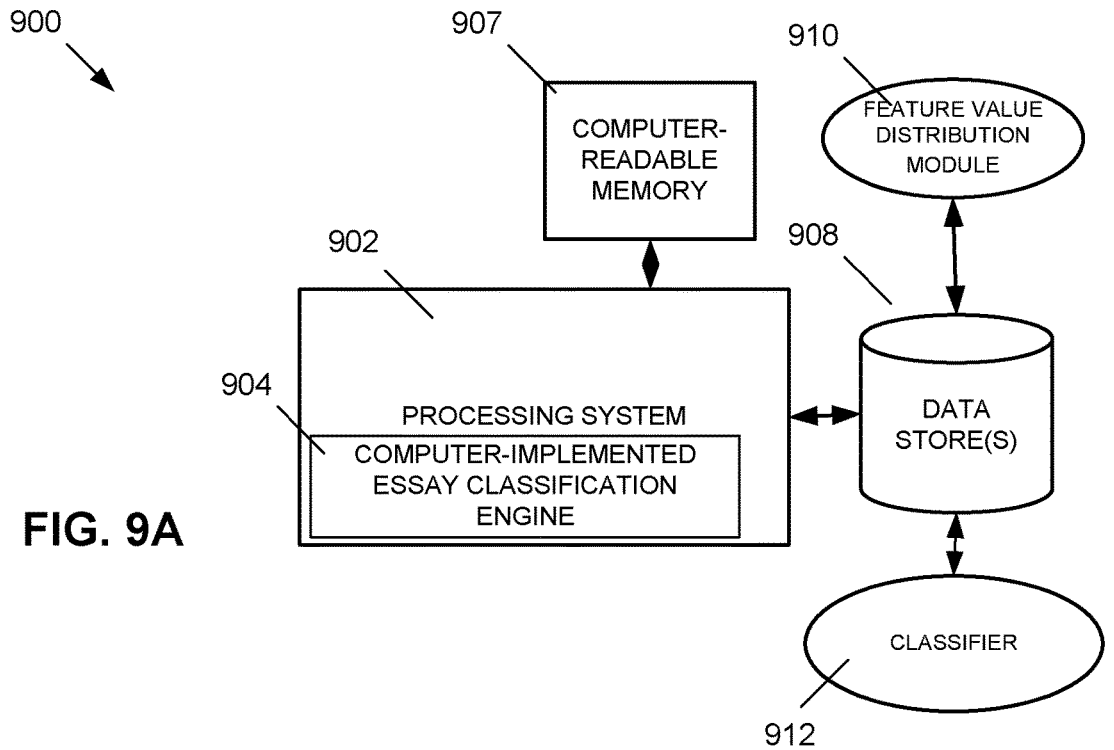
FIGS. 9A, 9B, and 9C depict example systems for implementing the approaches described herein for processing a group of essays to detect nonsensical computer-generated essays.
Figure 9B:
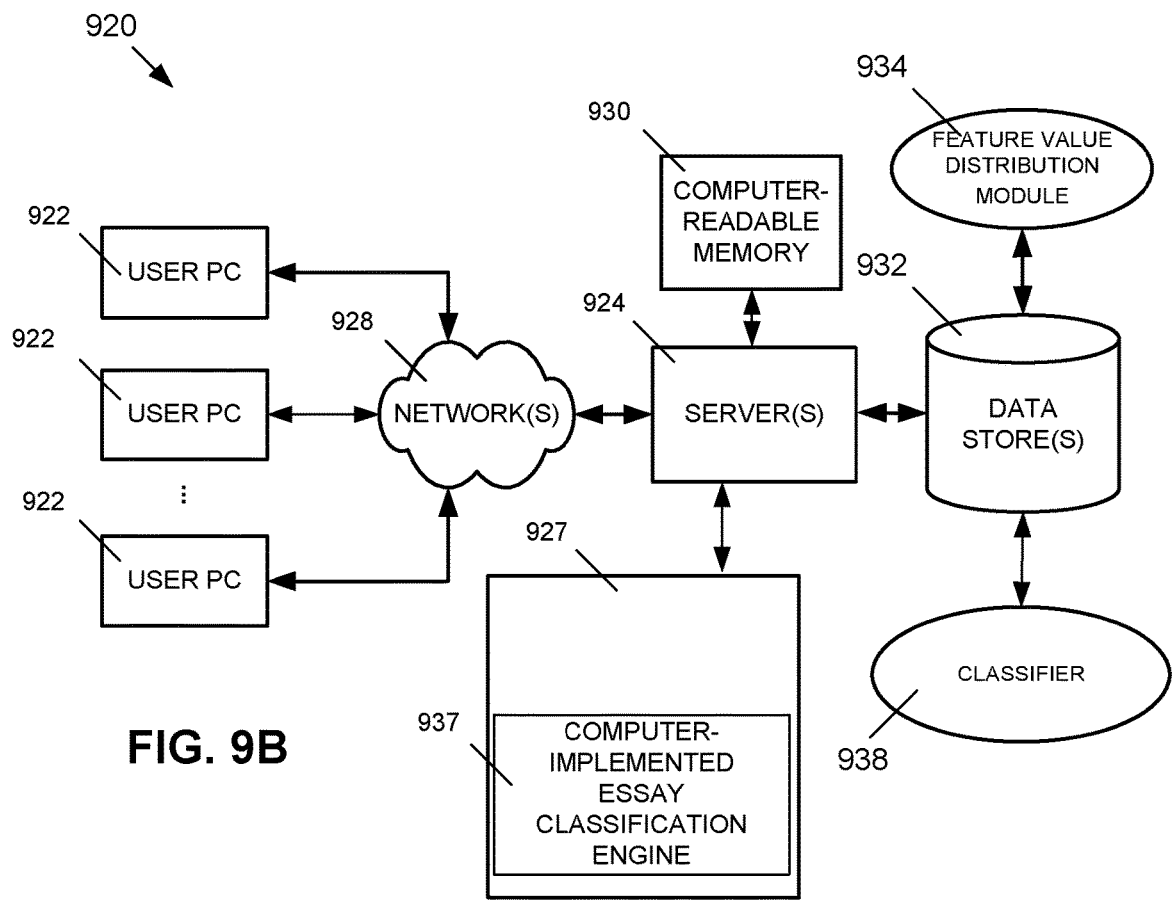
Figure 9C:
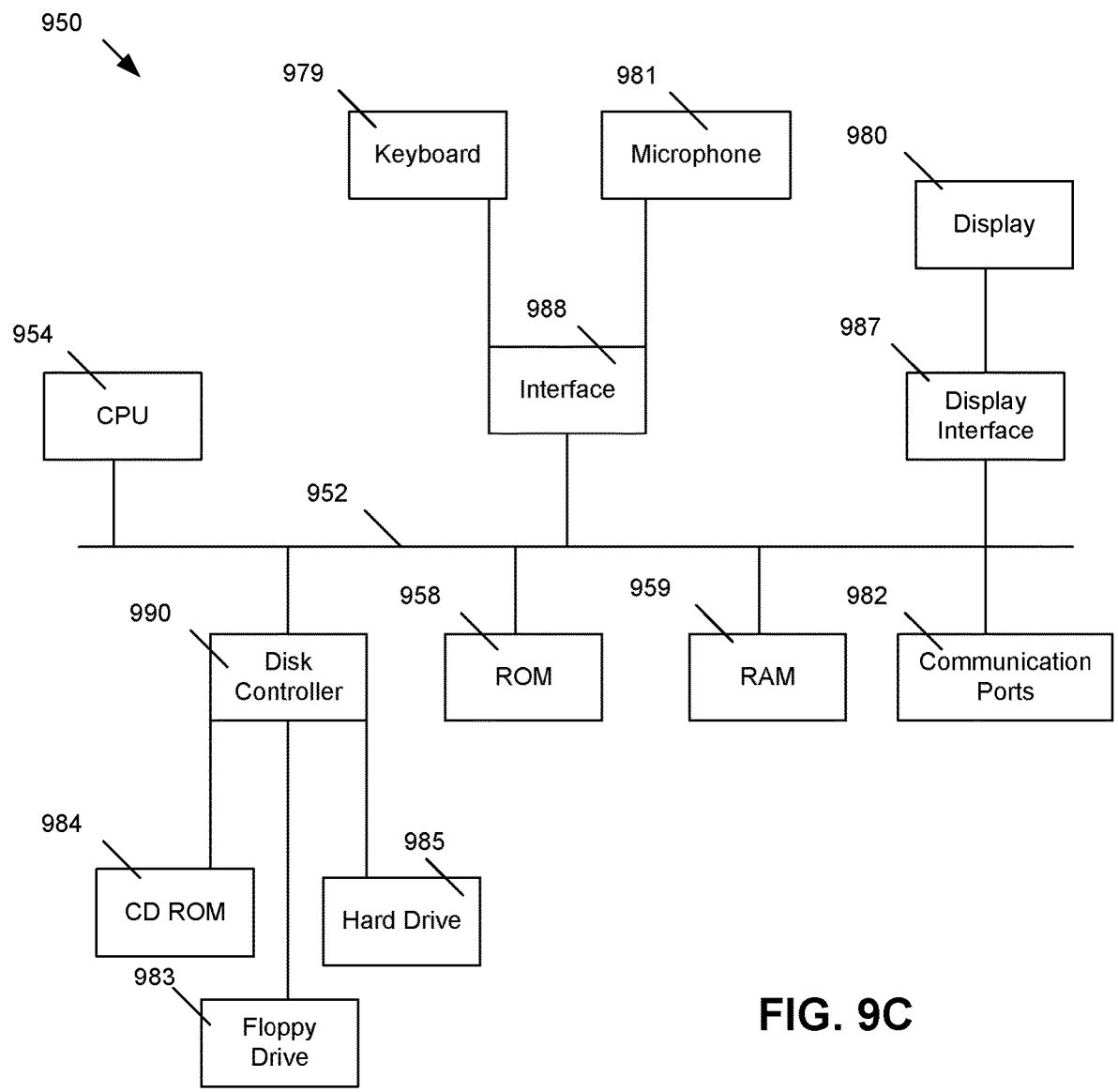

FIGS. 9A, 9B, and 9C depict example systems for implementing the approaches described herein for developing a classifier that detects nonsensical computer-generated essays. For example, FIG. 9A depicts an exemplary system 900 that includes a standalone computer architecture where a processing system 902 (e.g., one or more computer processors located in a given computer or in multiple computers that may be separate and distinct from one another) includes a computer-implemented essay classification engine 904 being executed on the processing system 902. The processing system 902 has access to a computer-readable memory 907 in addition to one or more data stores 908. The one or more data stores 908 may include a feature value distribution module 910 as well as a classifier 912. The processing system 902 may be a distributed parallel computing environment, which may be used to handle very large-scale data sets.

FIG. 9B depicts a system 920 that includes a client-server architecture. One or more user PCs 922 access one or more servers 924 running a computer-implemented essay classification engine 937 on a processing system 927 via one or more networks 928. The one or more servers 924 may access a computer-readable memory 930 as well as one or more data stores 932. The one or more data stores 932 may include a feature value distribution module 934 as well as a classifier 938.

FIG. 9C shows a block diagram of exemplary hardware for a standalone computer architecture 950, such as the architecture depicted in FIG. 9A that may be used to include and/or implement the program instructions of system embodiments of the present disclosure. A bus 952 may serve as the information highway interconnecting the other illustrated components of the hardware. A processing system 954 labeled CPU (central processing unit) (e.g., one or more computer processors at a given computer or at multiple computers), may perform calculations and logic operations required to execute a program. A non-transitory processor-readable storage medium, such as read only memory (ROM) 958 and random access memory (RAM) 959, may be in communication with the processing system 954 and may include one or more programming instructions for performing the method of processing a group of essays to develop a classifier that detects nonsensical computer-generated essays. Optionally, program instructions may be stored on a non-transitory computer-readable storage medium such as a magnetic disk, optical disk, recordable memory device, flash memory, or other physical storage medium.

In FIGS. 9A, 9B, and 9C, computer readable memories 907, 930, 958, 959 or data stores 908, 932, 983, 984, 988 may include one or more data structures for storing and associating various data used in the example systems to develop a classifier that detects nonsensical computer-generated essays. For example, a data structure stored in any of the aforementioned locations may be used to store data from XML files, initial parameters, and/or data for other variables described herein. A disk controller 990 interfaces one or more optional disk drives to the system bus 952. These disk drives may be external or internal floppy disk drives such as 983, external or internal CD-ROM, CD-R, CD-RW or DVD drives such as 984, or external or internal hard drives 985. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 990, the ROM 958 and/or the RAM 959. The processor 954 may access one or more components as required.

A display interface 987 may permit information from the bus 952 to be displayed on a display 980 in audio, graphic, or alphanumeric format. Communication with external devices may optionally occur using various communication ports 982.

In addition to these computer-type components, the hardware may also include data input devices, such as a keyboard 979, or other input device 981, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A processor implemented method of processing a group of essays comprising:
   accessing a data structure that contains a group of essays, wherein the group of essays includes predetermined nonsensical computer-generated essays and predetermined good-faith essays;
   extracting features from each of the predetermined nonsensical computer-generated essays and each of the good-faith essays, the extracted features comprising one or more of: grammar errors, usage errors, mechanics errors, development, organization, vocabulary sophistication, correct usage of collocations and prepositions, sentence variety, lexical complexity, holistic measure of grammaticality, discourse coherence, and how well source material is integrated into the response;
   assigning, based on the extracting, feature values for the predetermined nonsensical computer-generated essays;
   assigning, based on the extracting, feature values for the predetermined good-faith essays;
   measuring the distribution of feature values between the predetermined nonsensical computer-generated essays and the predetermined good-faith essays;
   developing a classifier that detects whether an essay is a nonsensical computer-generated essay, wherein the classifier is developed using the distribution of feature values;
   receiving data comprising a selected essay;
   analyzing the selected essay to set a binary value, wherein the classifier sets the binary value if it detects a nonsensical computer-generated essay; and
   generating an essay classification for the selected essay based on the binary value, wherein the essay classification is stored in a computer readable medium and is outputted for display on a graphical user interface, transmitted across a computer network, or printed.

2. The method of claim 1, further comprising:
   applying the essay classification to an automated essay scoring system, wherein the automated scoring system uses an advisory to detect a nonsensical computer-generated essay;
   triggering the advisory if the essay classification indicates that the binary value is set.

3. The method of claim 2, further comprising:
   flagging the essay for human review if the advisory is triggered.

4. The method of claim 3, wherein the automated scoring system is e-rater.

5. The method of claim 4, wherein the extracted features comprise linguistically-motivated features of writing and the feature values are assigned and are then used in a linear regression model.

6. The method of claim 1, wherein the distribution of feature values between the predetermined nonsensical computer-generated essays and the predetermined good-faith essays is measured using the Kolmogorov-Smirnov statistic.

7. The method of claim 1, wherein the group of essays are randomly divided into training essays and test essays.

8. The method of claim 7, wherein the 80% of the group of essays are training essays and 20% of the group of essays are test essays.

9. The method of claim 7, wherein the classifier is a random-forest classifier, wherein the random-forest classifier is developed using the distribution of feature values for the training essays.

10. A processor implemented system for processing a group of essays to detect nonsensical computer-generated essays, comprising:
    one or more data processors;
    a computer-readable medium encoded with instructions for commanding the one or more data processors to execute operations comprising:
       accessing a data structure that contains a group of essays, wherein the group of essays includes predetermined nonsensical computer-generated essays and predetermined good-faith essays;
       extracting features from each of the predetermined nonsensical computer-generated essays and each of the good-faith essays, the extracted features comprising one or more of: grammar errors, usage errors, mechanics errors, development, organization, vocabulary sophistication, correct usage of collocations and prepositions, sentence variety, lexical complexity, holistic measure of grammaticality, discourse coherence, and how well source material is integrated into the response;
       assigning, based on the extracting, feature values for the predetermined nonsensical computer-generated essays;

assigning, based on the extracting, feature values for the predetermined good-faith essays;

measuring the distribution of feature values between the predetermined nonsensical computer-generated essays and the predetermined good-faith essays;

developing a classifier that detects whether an essay is a nonsensical computer-generated essay, wherein the classifier is developed using the distribution of feature values;

receiving data comprising a selected essay;

analyzing the selected essay to set a binary value, wherein the classifier sets the binary value if it detects a nonsensical computer-generated essay; and generating an essay classification for the selected essay based on the binary value, wherein the essay classification is stored in a computer readable medium and is outputted for display on a graphical user interface, transmitted across a computer network, or printed.

11. The method of claim 10, further comprising:

applying the essay classification to an automated essay scoring system, wherein the automated scoring system uses an advisory to detect a nonsensical computer-generated essay;

triggering the advisory if the essay classification indicates that the binary value is set.

12. The method of claim 11, further comprising:

flagging the essay for human review if the advisory is triggered.

13. The method of claim 10, wherein the group of essays are randomly divided into training essays and test essays.

14. A computer-implemented method of processing a group of essays to detect nonsensical computer-generated essays comprising:

accessing a data structure that contains a group of essays, wherein the group of essays includes predetermined nonsensical computer-generated essays and predetermined good-faith essays;

extracting features from each of the predetermined nonsensical computer-generated essays and each of the good-faith essays, the extracted features comprising attributes corresponding to each of: grammar errors, usage errors, mechanics errors, development, organization, vocabulary sophistication, correct usage of collocations and prepositions, sentence variety, lexical complexity, holistic measure of grammaticality, discourse coherence, and how well source material is integrated into the response;

assigning, based on the extracting, feature values for the predetermined nonsensical computer-generated essays;

assigning, based on the extracting, feature values for the predetermined good-faith essays;

measuring the distribution of feature values between the predetermined nonsensical computer-generated essays and the predetermined good-faith essays;

developing a classifier that detects whether an essay is a nonsensical computer-generated essay, wherein the classifier is developed using the distribution of feature values.

15. The method of claim 14, further comprising:

applying the essay classification to an automated essay scoring system, wherein the automated scoring system uses an advisory to detect a nonsensical computer-generated essay;

triggering the advisory if the essay classification indicates that a binary value is set.

16. The method of claim 15, further comprising:

flagging the essay for human review if the advisory is triggered.

17. The method of claim 16, wherein the automated scoring system is e-rater.

18. The method of claim 17, wherein the extracted features comprise linguistically-motivated features of writing and the feature values are assigned and are then used in a linear regression model.

19. The method of claim 18, wherein the distribution of feature values between the predetermined nonsensical computer-generated essays and the predetermined good-faith essays is measured using the Kolmogorov-Smirnov statistic.

20. The method of claim 14, wherein the group of essays are randomly divided into training essays and test essays, and wherein the method further comprises:

receiving data comprising a selected essay;

analyzing the selected essay to set a binary value, wherein the classifier sets the binary value if it detects a nonsensical computer-generated essay; and generating an essay classification for the selected essay based on the binary value, wherein the essay classification is stored in a computer readable medium and is outputted for display on a graphical user interface, transmitted across a computer network, or printed.

\* \* \* \* \*